United States Patent [19]

Aiba

[11] 4,329,695

[45] May 11, 1982

[54] CHARGE TIMING EVALUATION IN AN INK JET SYSTEM PRINTER OF THE CHARGE AMPLITUDE CONTROLLING TYPE

[75] Inventor: Masahiko Aiba, Nara, Japan

[73] Assignee: Sharp Kabushiki Kaisha, Osaka, Japan

[21] Appl. No.: 124,850

[22] Filed: Feb. 26, 1980

[30] Foreign Application Priority Data

Feb. 26, 1979 [JP] Japan ................................ 54-22402

[51] Int. Cl.[3] ........................................... G01D 18/00

[52] U.S. Cl. ........................................... 346/75

[58] Field of Search .................................. 346/75

[56] References Cited

U.S. PATENT DOCUMENTS 3,769,632 10/1973 Julisburger et al. .................. 346/75

4,012,745 3/1977 Brown et al. ...................... 346/75 X 4,025,926 5/1977 Fujimoto et al. ................. 346/75 X

*Primary Examiner*—L. T. Hix

*Assistant Examiner*—W. J. Brady

*Attorney, Agent, or Firm*—Birch, Stewart, Kolasch & Birch

[57] ABSTRACT

In an ink jet system printer of the charge amplitude controlling type, an electric current flows through an ink droplet issuance unit to ink liquid when an ink droplet is properly charged by a charging tunnel. A detection circuit is connected to the ink droplet issuance unit for detecting the electric current flowing through the ink droplet issuance unit, a determination output of the detection circuit being used for the phase synchronization purposes. A search pulse comprises a first group of search pulse of a predetermined phase and a second group of search pulse of another phase deviated from the predetermined phase. These two groups are alternatingly applied to the charging tunnel at a given selection frequency. If the application of either one group of the search pulse is timed in agreement with the droplet separation phase, an alternating current of a frequency corresponding to the selection frequency of the search pulse group is detected by the detection circuit.

5 Claims, 13 Drawing Figures

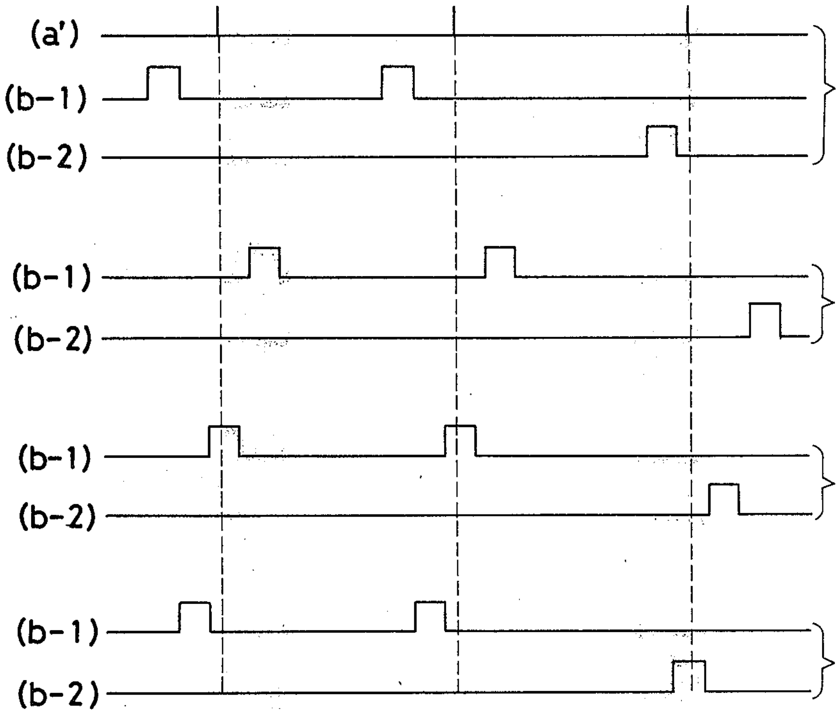
FIG. 6(A)
FIG. 6(B)
FIG. 6(C)
FIG. 6(D)
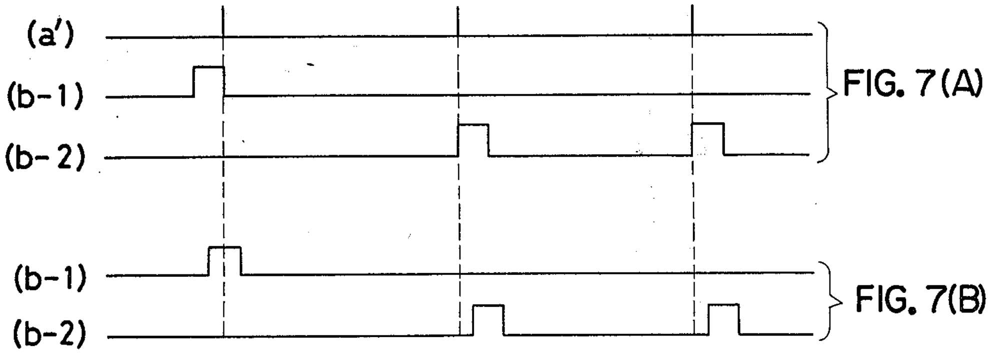
FIG. 7(A)
FIG. 7(B)

CHARGE TIMING EVALUATION IN AN INK JET SYSTEM PRINTER OF THE CHARGE AMPLITUDE CONTROLLING TYPE

BACKGROUND AND SUMMARY OF THE INVENTION

The present invention relates to an ink jet system printer of the charge amplitude controlling type and, more particularly, to a phase detection system in the ink jet system printer of the charge amplitude controlling type.

In an ink jet system printer of the charge amplitude controlling type, print distortion is mainly caused by interaction of ink droplets and air resistances occurring during travel of the ink droplets from a nozzle to a record receiving member. Accordingly, to minimize the print distortion, it is required to reduce the travel distance of the ink droplets.

A phase sensor electrode is conventionally disposed between a charging electrode and deflection means in order to detect charge conditions of phase detection ink droplets. The detection of the charge conditions of the phase detection ink droplets is necessary to perform accurate printing as disclosed in U.S. Pat. No. 4,025,926 entitled "PHASE SYNCHRONIZATION FOR INK JET SYSTEM PRINTER" on May 24, 1977, and in U.S. Pat. No. 3,769,632 entitled "DIGITAL PHASE CONTROL FOR AN INK JET RECORDING SYSTEM" on Oct. 30, 1973.

To minimize the above-mentioned travel distance of the ink droplets, it is very effective to omit the phase sensor electrode.

A novel charge timing detection system is proposed in copending application Ser. No. 917,592 now U.S. Pat. No. 4,288,796 PHASE DETECTION IN AN INK JET SYSTEM PRINTER OF THE CHARGE AMPLITUDE CONTROLLING TYPE, filed on June 21, 1978 by Masahiko Aiba and Ikuo Umeda and assigned to the same assignee as the present application, wherein a detection circuit is connected to a nozzle for detecting an electrical current which will flow from the nozzle to the ink liquid when application of a phase detection signal to a charging electrode is timed in agreement with a droplet formation phase.

However, in the system disclosed in Ser. No. 917,592, now U.S. Pat. No. 4,288,796, the detection circuit detects a D.C. signal. Accordingly, the detection reliability is low due to noise. Experimentation has revealed that the detection current is around $10^{-9}$ amperes and it is very difficult to amplify the thus detected current without being influenced by noise.

Accordingly, an object of the present invention is to provide a novel charge timing detection system in an ink jet system printer of the charge amplitude controlling type.

Another object of the present invention is to enhance the reliability of a phase detection system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection circuit is connected to an ink droplet issuance unit for detecting an electric current flowing through the ink droplet issuance unit to ink liquid contained in the ink droplet issuance unit. When an application of a phase detection signal is timed in agreement with the droplet formation phase, the electric current flows through the ink droplet issuance unit.

The phase detection signal is divided into two groups, one for charging the ink droplets when a preferred phase relationship is maintained and the other for not charging the ink droplets when the preferred phase relationship is maintained. These two groups of the phase detection signal are alternatingly applied to the charging electrode for evaluating the charge timing. Accordingly, when the preferred phase relationship is maintained, the detection circuit detects an A.C. signal which will not be influenced by noise.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 6(A) through 6(D), and FIGS. 7(A) and 7(B) are time charts for explaining operation modes of the charge condition detection search pulse generation circuit of FIG. 3.

DESCRIPTION OF THE PREFERRED EMBODIMENTS

Figure 1:
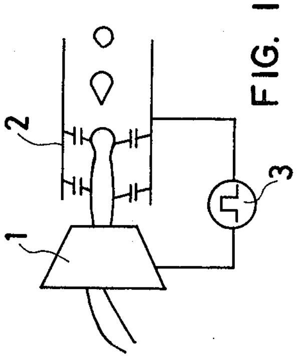
FIG. 1 is a schematic sectional view for explaining a charging operation in an ink jet system printer of the charge amplitude controlling type.

Referring now in detail to the drawings, and to facilitate a more complete understanding of the present invention, a charging operation in an ink jet system printer of the charge amplitude controlling type will be first described with reference to FIG. 1.

Ink liquid is emitted from a nozzle 1 to which an ultrasonic vibrator is attached for providing ink droplets of a given frequency. A charging signal 3 is applied to a charging electrode 2 at a timing in agreement with the drop formation phase. When the charging signal application is timed in agreement with the droplet separation phase, an electric current flows through the nozzle 1 to the ink liquid. The thus generated electric current can be monitored to evaluate whether an optimum phase relationship is maintained. A typical system for detecting the above-mentioned electric current is disclosed in copending application Ser. No. 917,592 now U.S. Pat. No. 4,288,796, PHASE DETECTION IN AN INK JET SYSTEM PRINTER OF THE CHARGE AMPLITUDE CONTROLLING TYPE, filed on June 21, 1978 by Masahiko Aiba and Ikuo Umeda and assigned to the same assignee as the present application.

However, attention must be directed to the fact that an electrostatic capacity coupling is formed between the nozzle 1 and the charging electrode 2. Therefore noise is induced in the detected electric current, which will prevent an accurate detection. In accordance with experimentation, the detection signal has a magnitude of about −100 dB and the noises have a magnitude of about −60 dB. If the phase detection signal is continuously applied to the charging electrode 2, the detected electric current shows a substantially direct current feature and, therefore, it is very difficult to remove the noise from the detected electric current.

The present invention is to minimize the above-mentioned defects. The above-mentioned noise can be easily removed when the detection current shows an alternating current feature.

Figure 2:
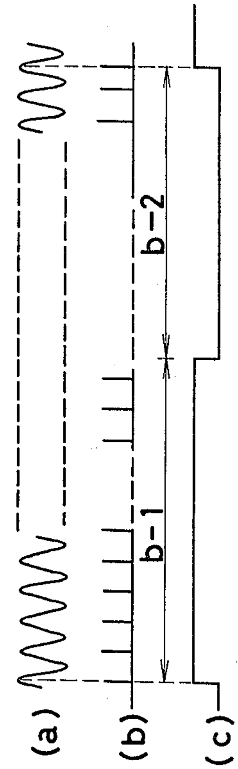
FIG. 2 is a time chart for explaining a charge condition detection search pulse of the present invention.

To obtain the detection current of the alternating current feature, in accordance with the present invention, charge condition detection search pulses are divided into two groups. More specifically, an oscillation control signal (a) shown in FIG. 2 is applied to the ultrasonic vibrator for providing the ink droplets at a frequency determined by the oscillation control signal (a). A charge condition detection search pulse (b) shown in FIG. 2 has the same frequency as the oscillation control signal (a) and has a considerably short pulsewidth as compared with the oscillation control signal (a). The charge condition detection search pulse (b) is applied to the charging electrode 2 for detection purposes.

The charge condition detection search pulse (b) is divided into two groups (b-1) and (b-2) in response to a selection pulse (c) of 2.5 KHz as shown in FIG. 2. The first group is a charging pulse (b-1) of which the phase is timed in agreement with the droplet separation phase, and the second group is a noncharging pulse (b-2) of which the phase is deviated from the droplet separation phase. Accordingly, when the charge condition detection search pulse (b-1) is applied to the charging electrode 2 and the charging pulse phase is synchronized with the droplet formation phase, the detected electric current shows an alternating feature determined by the selection pulse (c). The alternating electric current is also detected when the noncharging pulse (b-2) has the phase synchronized with the droplet formation phase. The detection current is the alternating signal of 2.5 KHz in each case.

Figure 3:
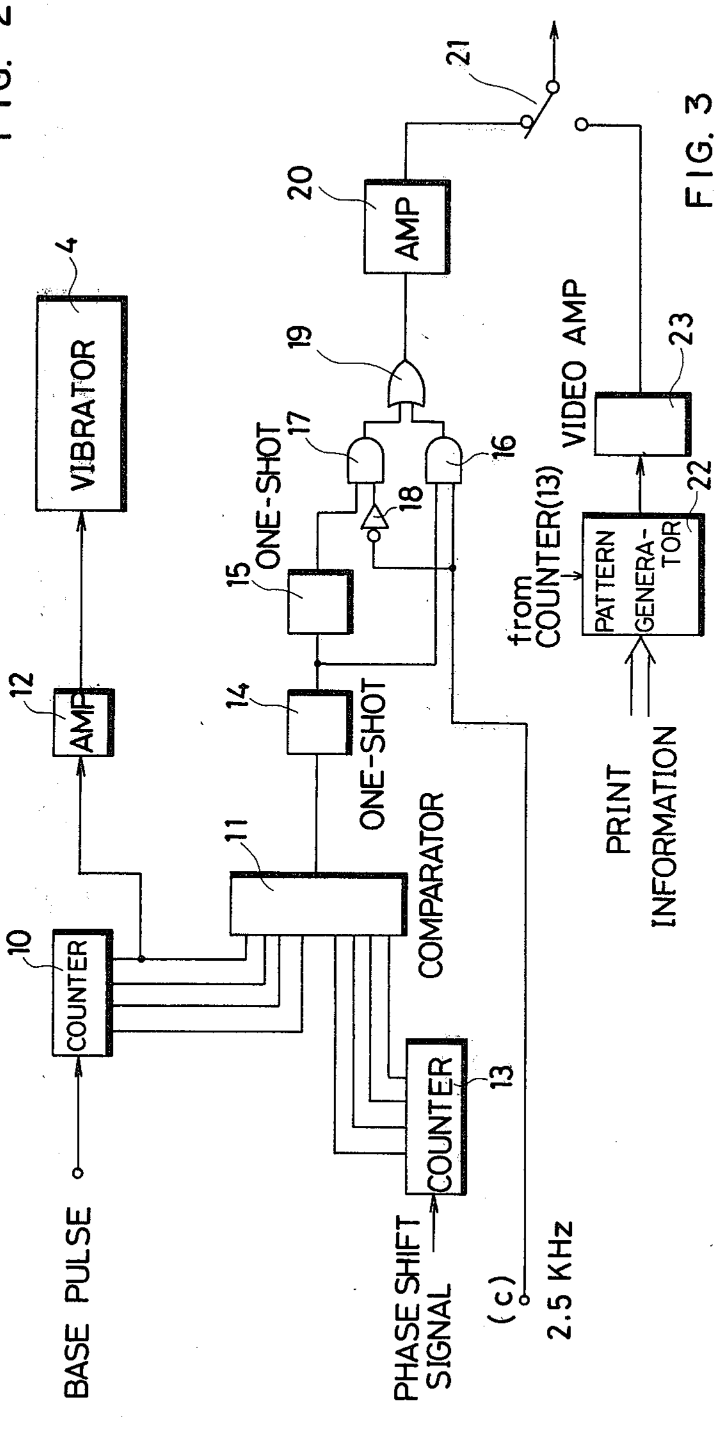
FIG. 3 is a block diagram of an embodiment of a charge condition detection search pulse generation circuit of the present invention.

FIG. 3 shows an embodiment of a charge condition detection search pulse generation circuit of the present invention, wherein the search pulse has a fixed phase for a predetermined period of time and the search pulse has another fixed phase for another predetermined period of time, and these two phases are alternatingly provided.

The charge condition detection search pulse generation circuit of FIG. 3 mainly comprises a counter 10 of radix sixteen (16). A base frequency pulse signal is applied to the counter 10, of which a four bit output is applied to one data terminal of a comparator 11. The fourth bit output, which has the cycle period sixteen times the base frequency pulse signal, is applied to an ultrasonic vibrator 4 fixed to the nozzle 1 through an amplifier 12. The output signal of the amplifier 12 is the oscillation control signal (a) shown in FIGS. 2 and 4 for providing the ink droplets at a given frequency.

Another counter 13 of radix sixteen (16) is provided for storing the phase condition. The counter 13 counts up a phase shift signal which is developed when an optimum phase relationship is not detected. Accordingly, if the optimum phase relationship is maintained and the charging operation is properly conducted, the contents stored in the counter 13 are not charged. The phase condition stored in the counter 13 is used to determine the phase of print charging signals which are applied to the charging electrode 2 for actual printing purposes. Four bit output signals of the counter 13 are applied to another data terminal of the comparator 11.

When the contents stored in the counters 10 and 13 are identical with each other, the comparator 11 develops a coincide detection output to activate a one-shot multivibrator 14. The one-shot multivibrator 14 is set for a period of time $\frac{1}{8}$ of the period of the oscillation control signal (a). The output signal of the one-shot multivibrator 14 is applied to another one-shot multivibrator 15 and an AND gate 16. The one-shot multivibrator 15 is turned set at the trailing edge of the output signal of the one-shot multivibrator 14, and the set condition is held for a period of time $\frac{1}{8}$ of the period of the oscillation control signal (a). An output signal of the one-shot multivibrator 15 is applied to an AND gate 17.

The other input terminal of the AND gate 16 is connected to receive the selection pulse (c) of 2.5 KHz. The other input terminal of the AND gate 17 is connected to receive an inverted selection signal of 2.5 KHz via an inverter 18. Accordingly, the AND gate 16 is made conductive for a half cycle of the selection pulse (c), and the AND gate 17 is made conductive for the remaining half cycle of the selection pulse (c). Output signals of the AND gates 16 and 17 are applied to an amplifier 20 through an OR gate 19. The thus obtained signals function as the charging pulse (b-1) and the noncharging pulse (b-2), and are applied through a selection switch 21 to a charging circuit connected to the charging electrode 2.

The selection switch 21 functions to selectively apply the charge condition detection search pulse and the print charging signal to the charging electrode 2. More specifically, a print information signal is applied to a pattern generator 22. Output signal of the pattern generator 22 are applied to a video amplifier 23 of which an output signal is a dot charging signal for actual printing purposes in an ink jet system printer of the charge amplitude controlling type. The output signal of the video amplifier 23 is applied to the other input terminal of the selection switch 21. Accordingly, the phase detection operation is conducted while the selection switch 21 is connected to the amplifier 20. After completion of the phase detection operation, the selection switch 21 is connected to the video amplfier 23 for actual printing purposes. The dot charging signal derived from the video amplifier 23 has the optimum phase determined by the counter 13.

Figure 5:
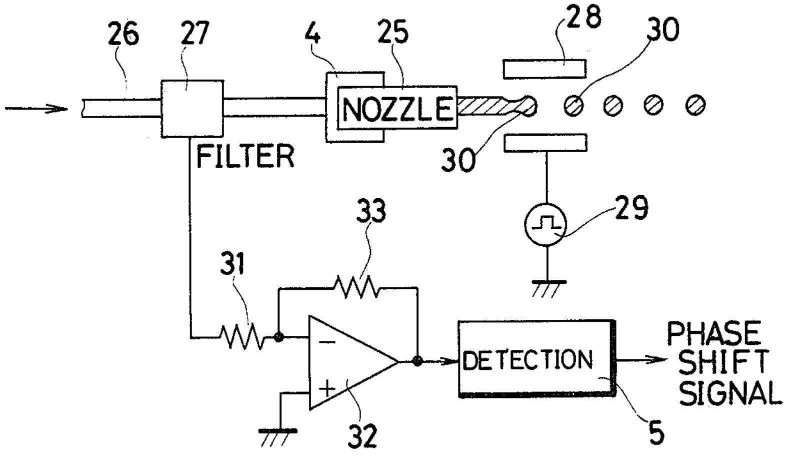
FIG. 5 is a block diagram of an embodiment of a charge condition detection circuit of the present invention.

FIG. 5 shows an embodiment of the charge condition detection circuit of the present invention.

A nozzle 25 is communicated with an ink supply of conduit 26 via a filter 27 made of an electrically conductive material. The ultrasonic vibrator 4 is attached to the nozzle 25 for forming ink droplets 30 at a given frequency. A charging electrode 28 is connected to receive a charging signal from a charging circuit 29. The charging circuit 29 is responsive to the signal derived from the selection switch 21 of FIG. 3 for selectively charging the ink droplets 30 with the charge condition detection search pulse and the dot charging signal.

The filter 27 is electrically connected to one input terminal of an operational amplifier 32 through a stabilizing resistor 31 of which the resistance value is considerably low, for example, about several tens ohms. The one input terminal of the operational amplifier 32 is connected to the output terminal of the operational amplifier 32 through a feed-back resistor 33 of about 1 MΩ. The other input terminal of the operational amplifier 32 is grounded. The operational amplifier 32 is preferably a low input-impedance current amplifier suited for removing the influences caused by the ink liquid impedance.

In the embodiment of FIG. 5, the resistance value between the filter 27 and the ground terminal is mainly determined by the ink liquid impedance and is not fixed due to the variations of the ink liquid characteristic. The resistance value is usually around 10 MΩ. If the ink droplets 30 are properly charged by the charging signal applied to the charging electrode 28, an electric current flows through the filter 27 to the ink liquid. By monitoring the electric current flowing through the filter 27 when the charge condition detection search pulse is applied to the charging electrode, the phase relationship between the droplet formation and the charging signal application can be evaluated. The above-mentioned electric current is accurately detected by the operational amplifier 32 without being influenced by the ink liquid impedance because the input-impedance of the operational amplifier is about 10Ω and the ink liquid impedance is about 10 MΩ. Accordingly, an output signal of the operational amplifier 32, under the condition where the charge condition detection search pulse is properly applied to the charging electrode 28, shows an alternating feature corresponding to the selection pulse (c) of 2.5 KHz. The thus obtained output signal of the operational amplifier 32 is applied to a determination (detection) circuit 5. When the optimum phase relationship is not held, the operational amplifier 32 does not develop the above-mentioned output signal, and in response thereto, the determination circuit 5 develops the phase shift signal which is applied to the counter 13 of FIG. 3.

The above-mentioned electric current is not necessarily detected through the use of the filter 27. Any electrically conductive material positioned near the nozzle 25 can be used for current detection purposes.

Now assume that the selection switch 21 is connected to the amplifier 20 for phase detection purposes. The amplifier 12 receives the fourth bit output signal of the counter 10 to develop the oscillation control signal (a), shown in FIGS. 2 and 4, which is applied to the ultrasonic vibrator 4. The ink droplets 30 are formed at a timing (a') shown in FIG. 4. The droplet formation timing is variable depending on the ink liquid characteristics as is well known in the art.

Figure 4:
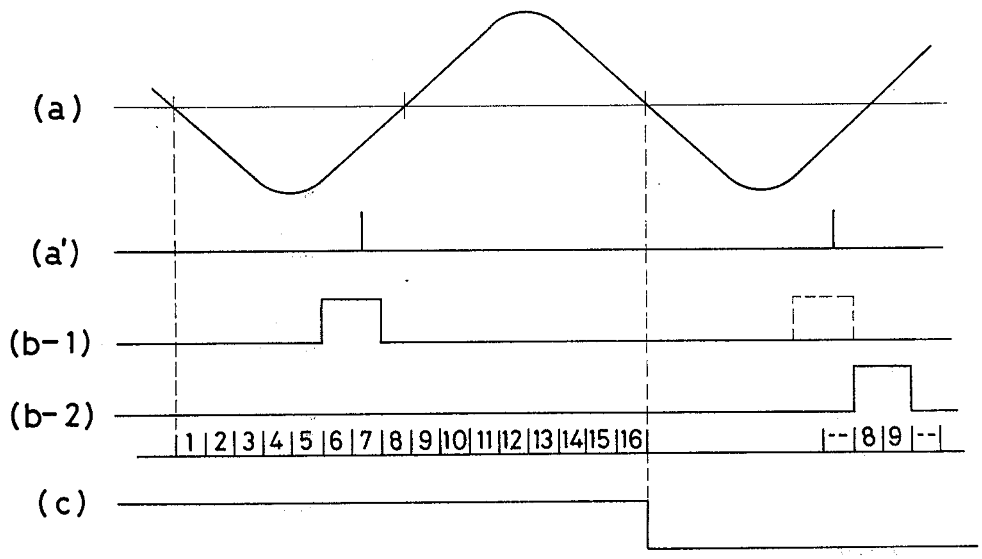
FIG. 4 is a time chart for explaining an operation mode of the charge condition detection search pulse generation circuit of FIG. 3.

When the contacts stored in the counter 10 become identical with the contents stored in the counter 13, the comparator 11 develops the coincide detection output to activate the one-shot multivibrator 14. In case of the charging period determined by the selection pulse (c) of 2.5 KHz, the AND gate 16 is made conductive and, therefore, the charging search pulse (b-1) shown in FIG. 4 is developed from the amplifier 20. The charging search pulse (b-1) is repeatedly developed from the amplifier 20, and is applied to the charging electrode 28 through the charging circuit 29 for a half cycle period of the selection pulse (c), every time at which the contents of the counter 10 reach the contents stored in the counter 13.

In case of the noncharging period determined by the selection pulse (c) of 2.5 KHz, the AND gate 17 is made conductive, and the set output signal of the one-shot multivibrator 15 is applied to the amplifier 20. Accordingly, the noncharging search pulse (b-2) shown in FIG. 4, which is phase shifted by $\frac{1}{8}$ period of the oscillation control signal (a) from the charging search pulse (b-1), is repeatedly developed from the amplifier 20 every time when the contents of the counter 10 reach the contents stored in the counter 13.

When the charging search pulse (b-1) is timed in agreement with the droplet separation timing (a') as shown in FIG. 4, the ink droplets 30 are not charged when the noncharging search pulse (b-2) is developed. More specifically, the ink droplet charging current flows through the filter 27 when the charging search pulse (b-1) is developed, but does not flow when the noncharging search pulse (b-2) is developed. Accordingly, the operational amplifier 32 develops the alternating output signal having the frequency of 2.5 KHz which corresponds to the frequency of the selection pulse (c). While the optimum phase relationship is maintained, the phase shift signal is never developed and, therefore, the contents stored in the counter 13 are maintained unchanged.

Under these conditions, when the selection switch 21 is connected to the video amplifier 23, the print charging signal is applied to the charging electrode 28, the print charging signal having the optimum phase determined by the contents stored in the counter 13.

If the charging search pulse (b-1) is not timed in agreement with the droplet separation phase, the determination circuit 5 develops the phase shift signal to increase the contents stored in the counter 13. In response to the phase shift signal, the charging search pulse (b-1) is phase shifted by 1/16 period of oscillation control signal (a). The phase shift operation is repeatedly conducted until the operational amplifier 32 develops the alternating outpt signal indicating that the search pulse (b-1) is timed in agreement with the droplet separation phase.

FIGS. 6(A) and 6(B) show conditions where neither the charging search pulse (b-1) nor the noncharging search pulse (b-2) is timed in agreement with the droplet formation phase. FIG. 6(C) shows a condition where the charging search pulse (b-1) is timed in agreement with the droplet separation timing (a'). FIG. 6(D) shows a condition where the noncharging search pulse (b-2) is timed in agreement with the droplet separation timing (a'). In cases of FIGS. 6(C) and 6(D), the alternating output signal is developed from the operational amplifier 32. Therefore, the print charging signal must be applied to the charging electrode 28 at the timing corresponding to the noncharging search pulse (b-2) when the condition shown in FIG. 6(D) occurs.

FIG. 7(A) shows a condition where the droplet separation timing (a') is positioned at the trailing edge of the charging search pulse (b-1) and the leading edge of the noncharging search pulse (b-2). In this case the alternating output signal will not be developed from the operational amplifier 32 even though the optimum phase relationship is maintained. However, upon next phase shift operation, the alternating output signal is certainly developed from the operational amplifier 32, because the shift pitch is 1/16 period of the oscillation control signal (a) and the search pulse has the pulsewidth corresponding to ⅛ period of the oscillation control signal (a) as shown in FIG. 7(B).

Figure 8:
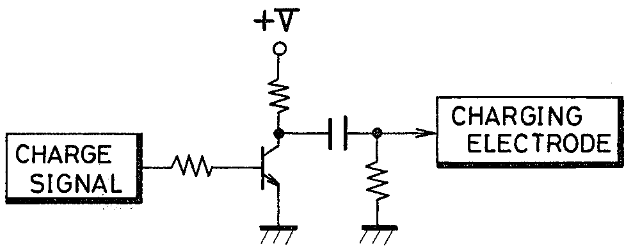
FIGS. 8 and 9 are circuit diagrams of examples of an amplifier of a charging signal to be applied to a charging electrode in an ink jet system printer of the present invention.
Figure 9:
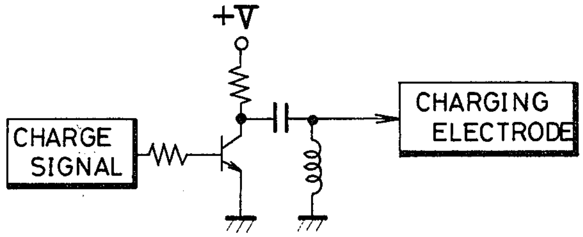

FIGS. 8 and 9 show examples of an amplifier included in the charging circuit 29.

To increase the SN ratio of the charging signal, the high-pass filter is desirably incorporated in the amplifier for the charging signal which is applied to the charging electrode 28. The embodiment of FIG. 8 includes the high-pass filter comprising the capacitor and the resistor, and the embodiment of FIG. 9 includes the high-pass filter comprising the capacitor and the coil.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer of the charge amplitude controlling type comprising:

ink droplet issuance means having an ink liquid disposed therein for developing ink droplets therefrom at a given frequency;

charging means for charging said ink droplets in accordance with print information; and phase synchronization means for synchronizing application of a charging signal to said charging means with separation timing of said ink droplets, said phase synchronization means comprising:

search pulse generation means for charging said ink droplets with a search pulse through the use of said charging means, said search pulse including a first group of search pulses of a predetermined phase and a second group of search pulses of another phase deviated from said predetermined phase; and charge condition detection means for monitoring the charge condition of the ink droplets charged by said search pulse, said charge condition detection means including an electrically conductive means contacting said ink liquid contained in said ink droplet issuance means; and current detection means for detecting an electric curent flowing through said electrically conductive means to said ink liquid.

2. The ink jet system printer of claim 1, wherein said current detection means comprises an operational amplifier connected to said electrically conductive means via a stabilizing resistor.

3. The ink jet system printer of claims 1, or 2, wherein said first group and said second group of search pulses are alternatingly applied to said charging means;

said ink droplets are charged only by said first group of search pulses; and said charge condition detection means detects an alternating signal caused by the charging of said ink droplets by said first group of search pulses.

4. The ink jet system printer of claim 3, wherein the search pulses have a pulsewidth corresponding to a ⅛ period of an ink droplet issuance period; and said second group of search pulses deviates in phase from said first group of search pulses by a ⅛ period of said ink droplet issuance period.

5. The ink jet system printer of claim 4, wherein said charge condition detection means further comprises:

determination means for determining whether an optimum phase relationship is maintained between the application timing of said search pulse and an ink droplet separation phase;

phase shift control signal generation means for developing a phase shift control signal when an affirmative answer is not obtained by said determination means; and phase shift means for shifting the phase of said search pulse by a 1/16 period of said ink droplet issuance period in response to said phase shift control signal.

* * * * *